United States Patent [19]

Kirschner

[11] Patent Number: 4,485,465
[45] Date of Patent: Nov. 27, 1984

[54] VIDEO DISC PLAYER HAVING TURNTABLE BRAKE MECHANISM

[75] Inventor: Thomas F. Kirschner, Indianapolis, Ind.

[73] Assignee: RCA Corporation, New York, N.Y.

[21] Appl. No.: 468,533

[22] Filed: Feb. 22, 1983

[51] Int. Cl.³ .................. G11B 17/00; G11B 1/00; G11B 19/10
[52] U.S. Cl. .................. 369/77.2; 369/79; 369/268
[58] Field of Search .................. 369/77.2, 79, 268

[56] References Cited

U.S. PATENT DOCUMENTS 4,326,284  4/1982  Elliott ........................ 369/268
4,412,320 10/1983  Tamakawa .................. 369/79
4,417,288 11/1983  Hattori et al. ............. 369/268
4,435,799  3/1984  Kirschner ................... 369/77.2
4,439,852  3/1984  Hughes ...................... 369/77.2

Primary Examiner—Steven L. Stephan
Attorney, Agent, or Firm—Paul J. Rasmussen; William H. Meise; Dilip A. Kulkarni

[57] ABSTRACT

A turntable brake mechanism comprises a brake shoe located beneath the turntable for motion between a raised position and a lowered position in response to raising and lowering a record lifting rod which passes through one of the slots in the turntable to transfer the record between the turntable and a set of record receiving pads positioned above the turntable. When raised, the brake shoe engages the underside of the turntable to oppose the rotation of the turntable. The brake shoe is spaced from the turntable, when retracted, to allow the turntable to rotate freely.

5 Claims, 6 Drawing Figures

VIDEO DISC PLAYER HAVING TURNTABLE BRAKE MECHANISM

This invention relates to a disc record player, and more particularly, to a turntable brake mechanism for use with a disc record player.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

It is beneficial to enclose a video disc in a protective caddy, which comprises a record retaining spine removably located within an outer jacket or sleeve. The record retaining spine has an opening in which a record is received to form a record/spine assembly. For record loading, a full caddy is inserted into an input slot provided in a video disc player at its front end. A record extracting mechanism disposed in the player removes the record/spine assembly from the caddy during subsequent jacket withdrawal, whereby the record is retained inside the player resting on a set of front and back record receiving pads. The retained record is then transferred to a rotatable turntable for playback. For record retrieval, the record is transferred back to the receiving pads, and an empty jacket is reinserted into the player to recapture the record/spine assembly.

In U.S. patent application of Hughes, Ser. No. 374,377, now U.S. Pat. No. 4,439,852, a record handling mechanism is described for selectively transferring a retained record between the turntable and the record receiving pads. The Hughes mechanism includes a record lifting finger which protrudes through one of the slots in the turntable to lift a record resting on the record receiving pads disposed above the turntable. The record lifting finger drives the record against a pair of stops located above the pads, and the pads are displaced out of the way. The record lifting finger is then lowered to a position beneath the turntable to gently lower the record onto the turntable for playback. The sequence of operations is reversed to transfer the record back to the record supporting pads. The record lifting finger is raised to elevate a turntable-supported record to a position against the stops above the receiving pads. The record supporting pads are moved back in place, and the record lifting finger is then withdrawn to achieve the transfer of the record back to the pads to redefine the record/spine assembly. An empty record sleeve is reinserted into the player to retrieve the record/spine assembly.

The video disc player is provided with a microcomputer-controlled DC motor for driving the turntable at the desired speed. The microcomputer stops the turntable at an angular position such that one of the turntable slots is over the record lifting finger when the turntable drive motor is switched off, so that the record lifting finger can be passed through it to transfer the record to and from the record receiving pads. To this end, the microcomputer rapidly slows the turntable motor down and then, when one of the turntable slots is over the record lifting finger, it applies opposing impulses of decreasing magnitude to the turntable (i.e., hunts) until the center line of the slot is over the lifting finger. U.S. patent application, Ser. No. 405,441, of Kelleher et al. describes the turntable drive and stopping mechanism.

To prevent an inadvertent insertion of a caddy or a sleeve into the player (e.g., when the record is being played), the caddy input slot is fitted with a door, which is coupled to the front record receiving pads. The caddy door shuts and opens the player input slot when the front receiving pads are, respectively, advanced and retracted.

Typically, the player of this type is subject to disposition in one of three operating modes—OFF, LOAD-/UNLOAD, and PLAY. In the OFF mode, the front receiving pads are advanced to close the caddy door, and the record lifting finger is raised all the way through one of the turntable slots to hold the turntable in place. To load a record into the player, the player is disposed in the LOAD mode. When so disposed, the record receiving pads are retracted, and the record lifting finger is slightly lowered to an intermediate position (below the receiving pads, but still above the turntable). The retraction of the front receiving pads opens the caddy door. The full caddy is then inserted into the player, and the sleeve is extracted out to leave the record/spine assembly inside the player. To transfer the retained record to the turntable, the player goes from the LOAD mode to the PLAY mode. The record lifting finger is raised to the highest position to drive the retained record against the stops, the record receiving pads are shifted out of the way, and the record lifting finger is then lowered to the lowest position (below the turntable) to deposit the record on the turntable and to free the turntable for rotation. When the front receiving pads are thus displaced out, the caddy door is closed. The turntable drive motor is then started, and the playback sequence is initiated.

To retrieve the record after playback, the sequence of operations is reversed. The player goes from the PLAY mode to the UNLOAD mode. The turntable is stopped such that one of the slots is over the record lifting finger. The record lifting finger is raised through the overhead turntable slot to drive the record against the stops. The receiving pads are moved back in place. The caddy door is opened when the front receiving pads are moved back. The record lifting finger is lowered to place the record onto the receiving pads to redefine the record/spine assembly. The record lifting finger is lowered to its intermediate position—below the receiving pads, but above the turntable. An empty sleeve is then reinserted into the player to recapture the record/spine assembly. After record removal, the player is driven from the UNLOAD mode to the OFF mode. In the process, the front pads are advanced to close the caddy door, and the record lifting finger is raised to the highest position.

As previously indicated, when the player goes from the PLAY to UNLOAD mode, the turntable is stopped such that one of the turntable slots is over the record lifting finger, and the record lifting finger is raised through the overhead slot. As the record lifting finger is raised, there is a possibility that the record lifting finger may cause the turntable to bounce back and forth. This might be due to the factors such as—the hunting of the turntable motor, the effects of gravity, etc.

As the record lifting finger is raised to the highest position and then lowered to an intermediate position to deposit the record onto the record receiving pads for retrieval, the turntable might gravitate to one side or the other (due to imbalances in the turntable weight distribution, etc.) until the record lifting finger engages the side wall of the turntable slot in which it is disposed. The engagement between the turntable and the record lifting finger might produce undesirable audible sounds.

When the player is turned off, the front receiving pads are advanced to close the caddy door. In the process, the record lifting finger is raised back up to the highest position. As the record lifting finger is driven from the intermediate position to the highest position, it may cause the turntable to jerk to-and-fro against the record lifting finger.

It is desirable to reduce the tendency of the turntable to bounce back-and-forth, and, in turn, produce undesirable clanking sounds. To this end, the video disc player is provided with a turntable brake mechanism in accordance with the principles of this invention. Located beneath the turntable is a brake member which is subject to motion between a raised position and a lowered position in response to the raising and lowering of the record lifting finger. In the raised position, the brake member engages the underside of the turntable to oppose the rotation of the turntable, for instance, when the player is in the LOAD/UNLOAD or OFF modes. When the record lifting finger is lowered, it depresses the brake member to release the turntable for rotation free from any hindrance by the brake member during playback.

Figure 1:
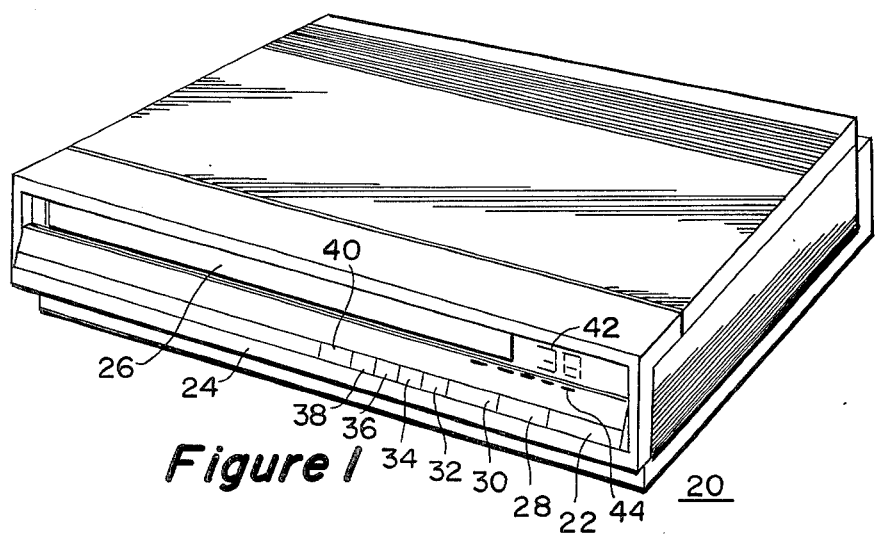
FIG. 1 is a video disc player incorporating the turntable brake mechanism of the subject invention.

Shown in FIG. 1 is a video disc player 20 incorporating the instant turntable brake mechanism. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The caddy input slot 26 is equipped with a pivotally-mounted door to keep out the foreign matter. The record is automatically deposited on a rotatable turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward/reverse)—to enable the viewer to quickly locate a precise section of the prerecorded program. In visual search, the stylus is rapidly moved across the record (16X) while in engagement therewith. In rapid access, the stylus is swept across the record at a much greater speed (120X) while the stylus is down. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
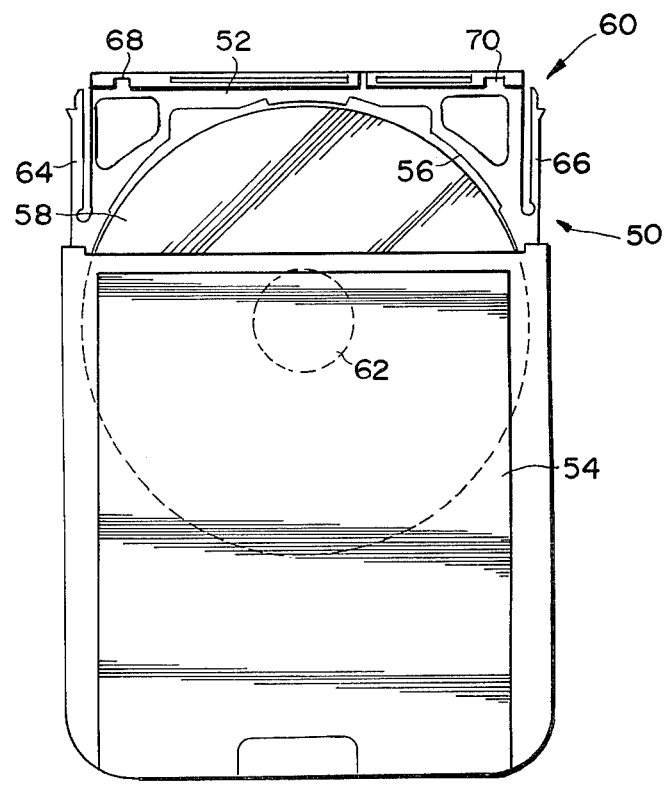
FIG. 2 depicts a video disc caddy suitable for use with the FIG. 1 video disc player in the practice of the present invention.

The caddy 50, depicted in FIG. 2, consists of a planar record retaining spine 52 removably enclosed in a flat outer sleeve 54. The retaining spine 52 has an opening 56 in which a centrally-apertured record 58 is received forming a record/spine assembly 60. The numeral 62 denotes the record center hole. Integrally molded with the spine 52 are spine latch fingers 64 and 66 for releasably securing the spine 52 in its sleeve 54. The spine 52 has cutouts 68 and 70 in which the respective spine gripper members of the player are received to secure the spine to the player for reasons explained later.

Figure 3:
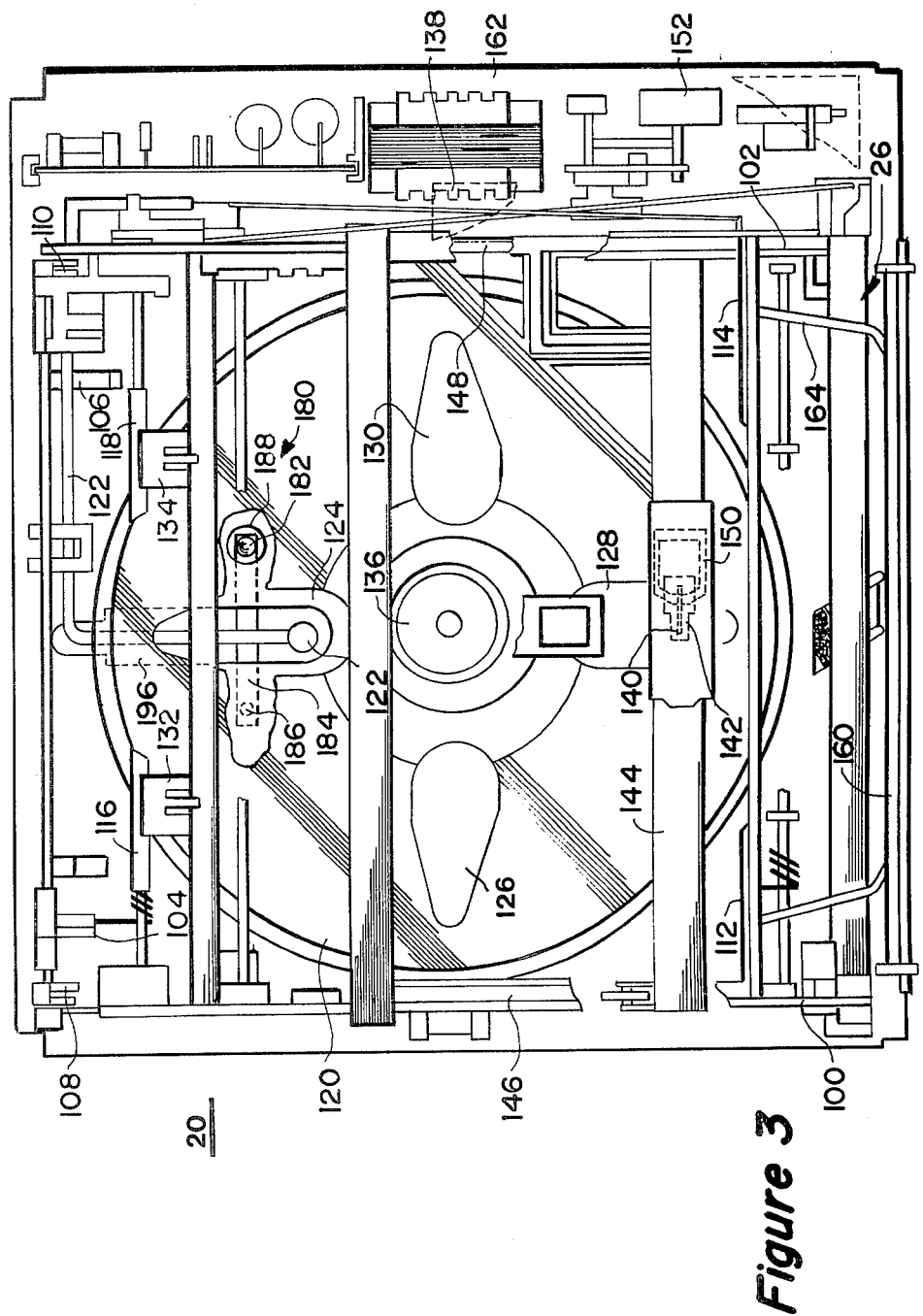
FIG. 3 shows the plan view of the video disc player of FIG. 1 with its lid removed to show the turntable brake mechanism.

To load a record, a full caddy 50 is inserted into the player through the input slot 26 along the guide tracks 100 and 102 depicted in FIG. 3. A pair of spine latch members 104 and 106 engage the cutouts 68 and 70 in the spine 52 to lock it to the player upon a full insertion of the caddy 50 into the player. Simultaneously, a pair of latch defeat fingers 108 and 110 enter into the jacket 54 to defeat the spine latch fingers 64 and 66 to free the spine 52 from the jacket. The empty jacket 54 is then withdrawn to leave the enclosed record/spine assembly resting on a set of retractable record receiving pads 112, 114, 116 and 118.

To transfer the retained record 58 to a turntable 120, a U-shaped record transfer rod 122 is raised through one of the four holes 124, 126, 128 and 130 in the turntable to drive the record up against a pair of stops 132 and 134. The record receiving pads 112, 114, 116 and 118 are then shifted out of the way, and the record transfer rod 122 is gently lowered to a level below the turntable 120 to cause the record 58 to deposit on the turntable. The turntable 120 is provided with a spindle 136, which engages the center hole 62 of the record 58 placed on the turntable to center it.

To drive the turntable 120, the player has a brushless DC motor located underneath the turntable. A microcomputer 138 controls the operation of the turntable drive motor. A commonly-assigned U. S. patent application, Ser. No. 405,441, of Kelleher et al. describes the turntable motor.

A pickup stylus 140 is housed in a protective cartridge 142, which, in turn, is located in a slidable carriage 144. The carriage 144 is translatably mounted for a front-to-back motion along a pair of guide rails 146 and 148. A stylus lifter 150, disposed in the carriage 144, gradually lowers the stylus 140 onto the record 58 resting on the turntable 120. During playback, a microcomputer-controlled DC stepper motor 152 drives the carriage 144 so as to cause it to follow the radially inward motion of the pickup stylus 140.

Following playback, the turntable drive motor is switched off, and the carriage 144 is returned to its off-record home position. The microcomputer 138 ensures that one of the four turntable slots 124, 126, 128 and 130 is over the record lifting finger 122 when the turntable drive motor is turned off. The details of how the turntable 120 is stopped at one of the four angular positions are given in the afore-mentioned Kelleher et al. patent application.

To transfer the turntable-supported record 58 to the receiving pads 112, 114, 116 and 118 to form the record/spine assembly 60, the record transfer rod 122 is raised through the opening 124 in the turntable 120 to lift the record to the position against the stops 132 and 134, the receiving pads are moved back in place, and the record transfer rod 122 is lowered to an intermediate position (below the pads but above the turntable). An empty jacket 54 is reinserted into the player to retrieve the record/spine assembly 60. The record transfer mechanism is described in detail in the aforesaid Hughes patent application.

The caddy input slot 26 is fitted with a swingable door 160, which is pivotally mounted to the player housing 162 by a set of integrally-molded pins. A C-shaped wire form 164 connects the front receiver pads 112 and 114 to the swingably-mounted caddy door 160 such that the caddy door is closed and opened when the front pads are advanced and retracted respectively.

As indicated in the Hughes patent application, the record handling mechanism is subject to disposition in one of three modes in response to the operation of the POWER button 22—OFF, LOAD/UNLOAD, and PLAY. When the POWER button 22 is first pressed, the player is driven from the OFF to the LOAD/UNLOAD mode to retract the record receiving pads 112, 114, 116 and 118, and to open the caddy door 160. In the LOAD/UNLOAD mode, the record lifting finger 122 is at the intermediate position. A full caddy 50 is inserted into the player and the sleeve 54 is withdrawn to leave the record/spine assembly 60 resting on the record receiving pads 112, 114, 116 and 118. Upon the withdrawal of the caddy sleeve 54, the player automatically goes to the PLAY mode to close the caddy door 160 and to transfer the retained record 58 to the turntable 120. In the PLAY mode, the record lifting finger 122 is occupying the lowest position. After completing the playback sequence, the player goes to the UNLOAD mode to transfer the record 58 back to the record receiving pads 112, 114, 116 and 118 to redefine the record/spine assembly and to open the caddy door 160. An empty sleeve 54 is then reinserted to capture the record/spine assembly 60, and the caddy 50 is withdrawn from the player. The POWER button is then depressed to advance the front receiving pads 112 and 114 in order to shut the caddy door 160, and to turn off the player. In the OFF mode, the record lifting finger 122 is disposed at the highest position.

As previously indicated, there are several occasions on which the turntable 120 might bounce back-and-forth against the lifting finger 122, thereby generating undesirable clanking sounds. It is advantageous to reduce the tendency of the turntable 120 to do so. To this end, the video disc player is equipped with a turntable brake mechanism 180 in accordance with this invention as shown in FIGS. 3–6. The turntable brake mechanism 180 includes a brake shoe 182 attached to the free end of a leaf spring 184. The other end of the leaf spring 184 is fixedly riveted to a downwardly depending post 186, which is integrally-molded with the player housing 162. The leaf spring 184 positions the brake member 182 such that it is adapted for passage through an opening 188 in the player housing 162 so as to engage the underside of the turntable 120, when raised, in the manner shown in FIG. 4. The player housing 162 is further provided with a pair of downwardly depending lugs 190 and 192, which straddle the leaf spring 184 in order to keep it centered with respect to the opening 188.

Figure 5:
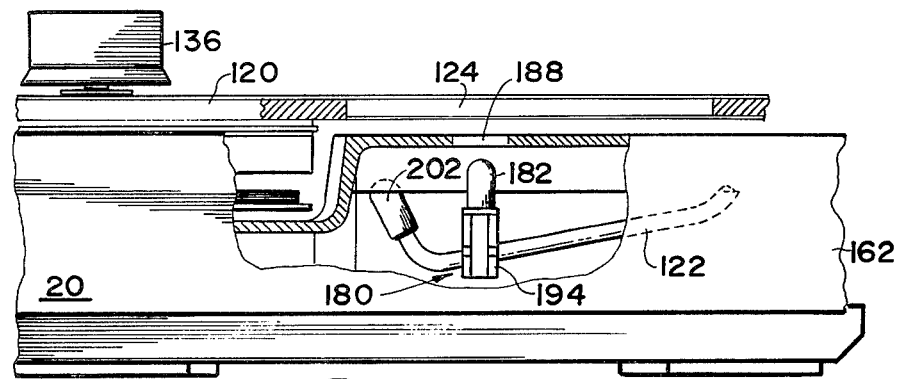
Figure 6:
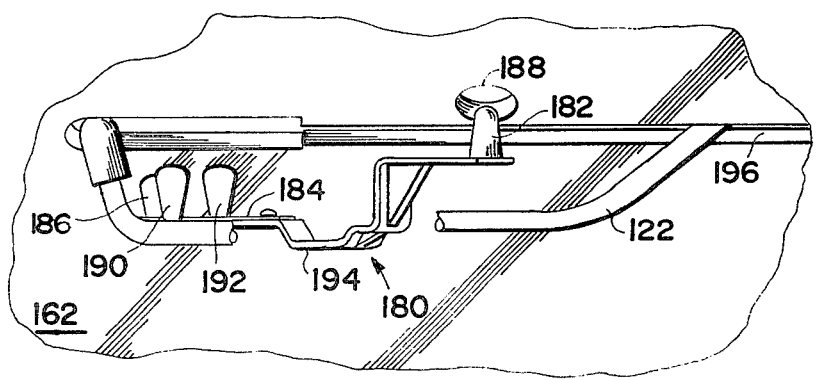
FIG. 6 portrays the perspective view of the turntable brake mechanism shown in FIGS. 3-5.

Normally, the leaf spring 184 biases the brake shoe 182 so as to cause it to protrude through the opening 188 in the player housing 162, and engage the underside of the turntable 120. The leaf spring 182 is located such that the record lifting finger 122 is subject to engagement with a recessed portion 194 of the brake shoe 182, when the record lifting finger is lowered to its lowest position through an elongated slot 196 in the player housing 162, to cause the brake shoe to retract to a position below the turntable 120 as illustrated in FIG. 5.

Figure 4:
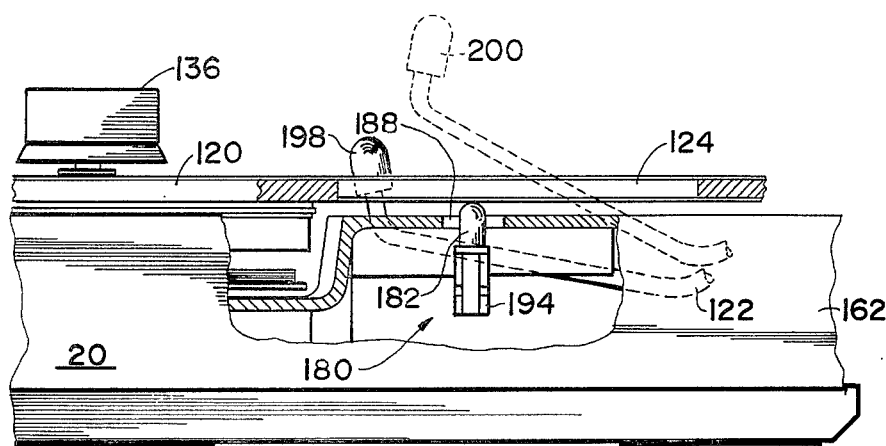
FIGS. 4 and 5 illustrate the sequence of operations of the instant turntable brake mechanism.

The brake shoe 182, thus, engages the underside of the turntable 120 when the record lifting finger 122 is occupying its intermediate position, identified by the numeral 198 in FIG. 4, when the player is in the LOAD/UNLOAD mode, or its highest position, designated by the numeral 200, when the player is in the OFF mode. On the other hand, when the player is in the PLAY mode, the record lifting finger 122 depresses the brake shoe 182 to a retracted position below the turntable 120, referred to by the numeral 202 in FIGS. 5 and 6.

The turntable brake mechanism 180 of the subject invention is simple and inexpensive. Moreover, it effectively eliminates undesirable clanking sounds due to the turntable 120 bouncing side-to-side against the record lifting finger 122 when the record lifting finger is raised and lowered for transferring the record between the record receiving pads 112–118 and the turntable.

What is claimed is:

1. In a record player having a record handling mechanism for transferring a record between a rotatable turntable and a set of record receiving pads located above said turntable; said record handling mechanism including a record transfer rod which is raised through a slot in said turntable to cause transfer of said record between said turntable and said receiving pads; said player further having means for driving said turntable during playback; said record transfer rod being lowered to a position below said turntable prior to turntable rotation; said player being provided with a mechanism for stopping said turntable at a location such that said slot is over said record transfer rod when said turntable drive means is turned off, so that said record transfer rod can be raised through said slot for record lifting and lowering; said turntable having a tendency to bounce against said record transfer rod when said rod is raised through said slot; turntable brake apparatus comprising:

a member mounted in said player beneath said turntable for motion between a depressed position and a raised position in response to the lowering and lifting of said record transfer rod; said member being spaced from the underside of said turntable when depressed to free said turntable for rotation, said member engaging said underside of said turntable when raised to oppose the rotation of said turntable, thereby substantially reducing said tendency of said turntable to bounce against said record transfer rod.

2. The turntable brake apparatus as defined in claim 1 further including a leaf spring carrying said member at one end thereof; said leaf spring biasing said member toward said turntable; said record transfer rod depressing said member away from said turntable when lowered.

3. The turntable brake apparatus as set forth in claim 1 for use with said player wherein said turntable has a plurality of slots; wherein said turntable stopping mechanism serves to stop said turntable at a location such that one of said slots is over said record transfer rod when said turntable drive means is switched off.

4. The turntable brake apparatus of claim 1 for use with said player wherein said turntable drive means comprises a DC drive motor controlled by a microcomputer; said microcomputer additionally serving to stop said turntable so that said slot in said turntable is over said record transfer rod.

5. The turntable brake apparatus as outlined in claim 1 for use with said player wherein said player is subject to disposition in the OFF, LOAD/UNLOAD, and PLAY modes; said record transfer rod occupying a raised, intermediate and a lowered position in response to the disposition of said player in said OFF, LOAD/UNLOAD and PLAY modes respectively; said record transfer rod being located and dimensioned such that said brake member engages said turntable when said player is in said OFF and LOAD/UNLOAD modes to oppose rotation of said turntable, and such that said member is spaced from said turntable when said player is in said PLAY mode to permit free rotation of said turntable.

* * * * *